G. W. JENNINGS.
Lawn Mower.
No. 31,668.
Patented March 12, 1861.
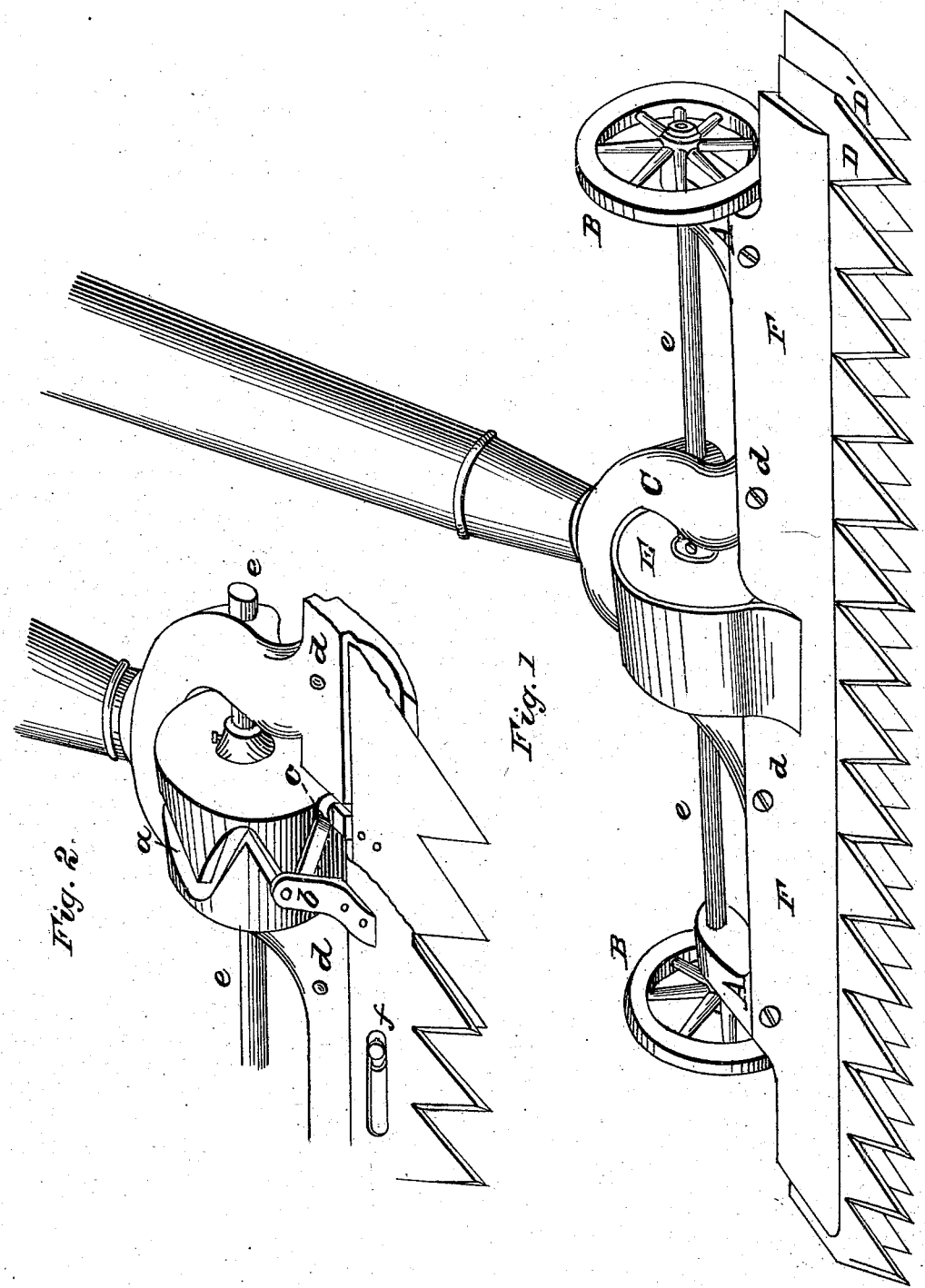

UNITED STATES PATENT OFFICE.

GEORGE W. JENNINGS, OF BOSTON, MASSACHUSETTS.

IMPROVEMENT IN MOWING-MACHINES.

Specification forming part of Letters Patent No. 31,668, dated March 12, 1861.

*To all whom it may concern:*

Be it known that I, GEORGE W. JENNINGS, of Boston, county of Suffolk, in the State of Massachusetts, have invented a new and useful Machine for Cutting Grass upon Lawns and Small Inclosures; and I do hereby declare the following to be a full, clear, and correct description of the same, reference being had to the accompanying drawings, and to the letters of reference marked thereon.

My invention relates to a grass-cutter with two saws, each having a motion in an opposite direction from the other, causing the cutting-edges to act upon the grass with greater velocity than would be the case if but one were used, as each cutter can be driven with as great rapidity as if but one cutter were employed.

To enable others to make and use my invention, I will proceed to describe its construction and operation.

The machine consists, first, of a bed-plate, or body, A A, Figure 1, supported by wheels B B, upon which it is moved upon the ground by handle C, in order to bring the saws or cutters D D' in contact with the grass. The saws rest upon the bed-plate A A, and are moved by the connections shown at $b\ c$, Fig. 2, acted upon by groove $a$ in cam-block E, which is firmly attached to shaft $e\ e$, to which the wheels are also fastened, and by which it is revolved. The cutters are retained in their place by pins fitted to slots in the cutter-plates, as shown at $f$, Fig. 2, and by the plate F F, secured to the body by screws $d\ d$, Fig. 1. The action is as follows: The connection of the under saw, $c$, being at one point of the cam-groove and that of the upper saw, $b$, at the opposite point, when $c$ is moved toward $b$ at the same time $b$ moves in an opposite direction toward $c$. In so doing they pass each other and change places. Consequently the saws are moved in relation to each other double the distance that the connections traverse, or of one point of the cam from another—that is, if the throw of the cam is one inch the under saw will move one inch in one direction while the other saw slides the same distance in the opposite direction, thereby moving the saws two inches in their relation to each other. To illustrate further, suppose the teeth to be one inch apart on each saw, if the points are together at commencing one will move one inch to the left while the other moves one inch to the right, causing the one tooth to pass by the two teeth of the other saw, or if the teeth are two inches apart they will meet, although the cam has but one-inch throw. By this means a long motion is given to the cutters, and therefore great velocity is imparted to the points without complicated machinery.

I am aware that machines have been used and patented for cutting grass using substantially the same machinery. Therefore I do not claim, broadly, a machine for that purpose; but

What I claim as my invention, and desire to secure by Letters Patent, is—

The arrangement of the cam-wheel E, shaft $e$, driving-wheels B B, bed-plate A, and cutters D D', provided with the arms and friction-rollers $b$ and $c$, working in the cam-groove $a$, the several parts being combined in the machine and operating in the manner and for the purpose specified.

GEORGE W. JENNINGS.

In presence of—
  J. G. ELKINS,
  D. T. HALL.